(12) United States Patent
Lynggaard et al.

(10) Patent No.: US 8,982,057 B2
(45) Date of Patent: Mar. 17, 2015

(54) METHODS AND SYSTEMS FOR PROCESSING DIGITALLY RECORDED DATA IN AN ELECTRONIC PEN

(75) Inventors: Stefan Lynggaard, Lund (SE); Johan Zander, Malmö (SE); Ola Sandström, Malmö (SE); Magnus Hollström, Spånga (SE)

(73) Assignee: Anoto AB, Lund (SE)

( * ) Notice: Subject to any disclaimer, the term of this patent is extended or adjusted under 35 U.S.C. 154(b) by 2374 days.

(21) Appl. No.: 11/812,351

(22) Filed: Jun. 18, 2007

(65) Prior Publication Data

US 2007/0247445 A1 Oct. 25, 2007

Related U.S. Application Data

(63) Continuation of application No. 11/630,129, filed as application No. PCT/SE2005/001026 on Dec. 20, 2006, now abandoned.

(60) Provisional application No. 60/583,618, filed on Jun. 30, 2004, provisional application No. 60/617,193, filed on Oct. 12, 2004.

(30) Foreign Application Priority Data

Jun. 30, 2004 (SE) ...................................... 0401687

(51) Int. Cl.
*G06F 3/041* (2006.01)
*G06F 5/00* (2006.01)
(Continued)

(52) U.S. Cl.
CPC .......... *G06F 3/03545* (2013.01); *G06F 3/0317* (2013.01)
USPC ............................. 345/173; 345/179; 345/156

(58) Field of Classification Search
USPC ................................................. 345/173, 179
See application file for complete search history.

(56) References Cited

U.S. PATENT DOCUMENTS 5,060,980 A 10/1991 Johnson et al.
(Continued)

FOREIGN PATENT DOCUMENTS

WO WO-99/50787 A1 10/1999
(Continued)

OTHER PUBLICATIONS

Chinese Office Action mailed Jul. 25, 2008 in Chinese Application No. 200580021785.X. 8 pages.
(Continued)

*Primary Examiner* — William Boddie
*Assistant Examiner* — Andrew Schnirel
(74) *Attorney, Agent, or Firm* — Finnegan, Henderson, Farabow, Garrett & Dunner LLP

(57) ABSTRACT

In an information management system for handling digital position data recorded by an electronic pen, the pen is controlled to convert recordings of a first code on a product to position data in a coordinate system, to convert recordings of a second code to input data, and to process the position data on the basis of the input data. The input data may define one or more functional areas in the coordinate system, and the pen may map the position data against the input data and take appropriate action if the position data is deemed to fall within a functional area. This allows the pen to be dynamically provided with a description of all or parts of the functional layout of a product, thereby reducing the need of the pen to pre-store such descriptions for all products. Encryption or usage may also be controlled based on data encoded by the second code. The product may be generated, via a computer-implemented method, to include the first code, the second code and any supporting graphics. The input data may alternatively be derived from another import interface of the pen, such as a communications interface or a replaceable memory unit.

22 Claims, 6 Drawing Sheets

(51) Int. Cl.
*G06F 3/0354* (2013.01)
*G06F 3/03* (2006.01)

(56) References Cited

U.S. PATENT DOCUMENTS

| | | |
|---|---|---|
| 5,140,139 A | 8/1992 | Shepard |
| 5,661,506 A * | 8/1997 | Lazzouni et al. ............. 345/179 |
| 6,072,917 A | 6/2000 | Mori et al. |
| 6,178,308 B1 | 1/2001 | Bobrow et al. |
| 6,330,976 B1 | 12/2001 | Dymetman et al. |
| 6,502,756 B1 | 1/2003 | Fahraeus |
| 6,570,104 B1 | 5/2003 | Ericson et al. |
| 6,663,008 B1 | 12/2003 | Pettersson et al. |
| 6,667,695 B2 | 12/2003 | Pettersson et al. |
| 6,678,499 B1 | 1/2004 | Silverbrook et al. |
| 6,732,927 B2 | 5/2004 | Olsson et al. |
| 6,929,183 B2 | 8/2005 | Pettersson et al. |
| 7,031,709 B2 | 4/2006 | Watanabe et al. |
| 7,091,959 B1 | 8/2006 | Clary |
| 7,236,177 B2 | 6/2007 | Sih et al. |
| 7,342,575 B1 | 3/2008 | Hartwell et al. |
| 7,492,787 B2 | 2/2009 | Ji et al. |
| 2001/0038349 A1 | 11/2001 | Hugosson et al. |
| 2002/0000981 A1 | 1/2002 | Hugosson et al. |
| 2002/0021284 A1 | 2/2002 | Wiebe |
| 2002/0034300 A1 | 3/2002 | Thuvesholmen et al. |
| 2002/0040816 A1 | 4/2002 | Sahlberg et al. |
| 2002/0044138 A1 | 4/2002 | Edso et al. |
| 2002/0091711 A1 | 7/2002 | Ericson |
| 2003/0016386 A1 | 1/2003 | Wiebe et al. |
| 2003/0021419 A1 | 1/2003 | Hansen et al. |
| 2003/0046256 A1 | 3/2003 | Hugosson et al. |
| 2003/0053699 A1 | 3/2003 | Olsson |
| 2003/0055865 A1 | 3/2003 | Fransson et al. |
| 2003/0061188 A1 | 3/2003 | Wiebe et al. |
| 2003/0074562 A1 | 4/2003 | Hansen et al. |
| 2003/0118233 A1 | 6/2003 | Olsson |
| 2003/0122746 A1 | 7/2003 | Rignell |
| 2003/0122802 A1 | 7/2003 | Bryborn |
| 2003/0122855 A1 | 7/2003 | Pattersson |
| 2003/0123745 A1 | 7/2003 | Bryborn |
| 2003/0128194 A1 | 7/2003 | Pettersson |
| 2003/0189664 A1 | 10/2003 | Olsson |
| 2005/0134563 A1 | 6/2005 | Hugosson et al. |

FOREIGN PATENT DOCUMENTS

| | | |
|---|---|---|
| WO | WO 00/72230 A1 | 11/2000 |
| WO | WO-01/16691 A1 | 3/2001 |
| WO | WO 02/065704 A1 | 8/2002 |
| WO | WO 02/075629 A1 | 9/2002 |
| WO | WO-03/056420 A1 | 7/2003 |
| WO | WO-03/105064 A1 | 12/2003 |
| WO | WO-2006/001769 A1 | 1/2006 |

OTHER PUBLICATIONS

Communication from the European Patent Office mailed Dec. 13, 2007 in Application No. 05755052.7. 6 pages.
USPTO Office Action mailed Apr. 26, 2010, in co-pending U.S. Appl. No. 11/666,323, 14 pgs.
USPTO Office Action mailed Jul. 16, 2010, in co-pending U.S. Appl. No. 11/630,129, 23 pgs.
USPTO Office Action mailed Jul. 16, 2010, in co-pending U.S. Appl. No. 11/630,901, 36 pgs.
USPTO Office Action mailed Nov. 24, 2010, in co-pending U.S. Appl. No. 11/666,323, 14 pgs.
USPTO Office Action mailed Dec. 6, 2010, in co-pending U.S. Appl. No. 11/630,129, 23 pgs.
USPTO Office Action mailed Dec. 6, 2010, in co-pending U.S. Appl. No. 11/630,901, 38 pgs.

* cited by examiner

METHODS AND SYSTEMS FOR PROCESSING DIGITALLY RECORDED DATA IN AN ELECTRONIC PEN

This application is a divisional of National Phase application 11/630,129 filed Dec. 20, 2006 under 37 C.F.R. 1.53(b) and claims priority thereof under 35 U.S.C. §120. The applicant further claims priority under 35 U.S.C. 119 (e) to U.S. Provisional Applications No. 60/583,618 and 60/617,193 filed on Jun. 30, 2004 and Oct. 12, 2004, respectively, and under 35 U.S.C. 119 (a) to Patent Application No. 0401687-9 filed in Sweden on Jun. 30, 2004, all of which are hereby expressly incorporated by reference into the present application.

FIELD OF THE INVENTION

The present invention generally relates to processing of digitally recorded data, and in particular to processing of this data in an electronic pen.

BACKGROUND ART

Electronic pens can be used for generation of information that electronically represents handwritten entries on a product with a writing surface. It would be desirable to incorporate such electronic pens in an information management system such that the electronic information could be efficiently conveyed to different destination units for further processing.

In US 2003/0061188, US 2003/0046256 and US 2002/0091711, which are herewith incorporated by reference, the present Applicant has suggested such information management systems in which a position code is applied to each product to code a plurality of absolute positions thereon. By reading the position code, electronic pens are capable of electronically recording a sequence of positions that reflects the pen motion on the product.

The position code on each product is a subset of a much larger abstract position-coding pattern. Examples of such abstract patterns are given in U.S. Pat. Nos. 6,570,104; 6,330,976 and 6,667,695, which are herewith incorporated by reference.

The abstract pattern is divided into subsets of given size, each such subset being associated in the system with a unique identifier. If each subset is intended for a respective physical page, it is denoted a pattern page and is represented by a unique page address. In such a case, each absolute position may be represented by a page address and a local position within the associated pattern page.

The electronic pens may have knowledge of the abstract position-coding pattern, via so-called templates that are pre-stored in the pen to define certain functional areas in the pattern, e.g. as described in Applicant's prior publication US 2003/0061188. The pen may process the recorded positions based on functions indicated by these templates and/or provide feedback to the pen user, e.g. by vibrating when recording a position in a certain functional area.

By designating different parts of the abstract pattern to different destination units, the electronic information can be automatically directed from the pen to the correct destination unit for processing. For example, the system may include an intermediary server which, upon receipt of one or more absolute positions from a pen, identifies an associated network address of the correct actor and directs the flow of data to this address.

Such a system is disclosed in Applicant's prior publication US 2003/0055865, in which an electronic pen in a first roundtrip establishes contact with a so-called paper lookup server (PLS) and inquires it for routing information based upon position data that the pen derived from a position-coded product. Then, upon receipt of the routing information from the PLS, the electronic pen in a second roundtrip establishes contact with an application server as indicated by the routing information. The application server then requests the relevant position data from the pen.

One disadvantage of the known system is that the products cannot be generated independently from other components of the information management system. For example, the pen must store a template for the product, the intermediary server must know where to direct the information recorded from a certain product, and the application server must know how to process this information.

Further, the known system requires the pen, the PLS and the respective application server, as well as the respective communication paths, to be accessible whenever data is to be transferred. A failure anywhere in the communication chain may potentially lead to data being lost, possibly without the user of the pen being properly notified thereof.

SUMMARY OF THE INVENTION

The object of the invention is to overcome the above problems of the prior art.

Generally, the objects of the invention are at least partly achieved by means of methods, electronic pens, computer program products, an information management system, and a product according to the independent claims, preferred embodiments being defined by the dependent claims.

One aspect of the invention is a method, in an electronic pen, comprising: converting recordings of a first code on a product to position data in a coordinate system; converting recordings of a second code to input data; and processing said position data on the basis of said input data.

Another aspect of the invention is an electronic pen, comprising: an image processor which is operable to determine position data in a coordinate system, based upon at least one image of a first code on a product, and to determine input data, based upon at least one image of a second code; and processing logic which is operable to process said position data on the basis of said input data.

Yet another aspect of the invention is a method of generating a product with supporting graphics and a first code that defines at least one absolute position in a coordinate system, comprising: retrieving input data for subsequent processing of said at least one absolute position; and commanding a printing device to generate said supporting graphics, said first code, and a second code on a substrate, said second code being generated to represent said input data.

A further aspect of the invention is a product, comprising: a surface; a first code on said surface, said first code defining at least one absolute position in a coordinate system; a second code on said surface, said second code representing input data for subsequent processing of said at least one absolute position.

These aspects have the general advantage of relaxing the dependence between products, pens and other components of the information management system. For example, any input data which hitherto has been either pre-stored in the pen or communicated to the pen by external system components may now be derived on demand, by the pen reading off the second code and suitably storing the corresponding input data in pen memory for future use.

For example, the input data may include a full or partial description of the functional layout of a product. The description may be used to supplement, or even replace, any descriptions pre-stored in pen memory. Thus, the pen need not pre-store such descriptions for all products. New descriptions and products may be generated without a need for the provider of the product or the pen to update a corresponding description in the pen.

If the pen has access to a complete description of the functional layout, it can give advanced user feedback, e.g. via an MMI of the pen, relating to any functional area on the product. Further, the pen can process the recorded position(s) in view of such a complete description and thus output data at a higher refinement level. For example, such refinement may include assigning the recorded position(s) to the functional areas, and/or processing the recorded positions according to rules that are associated with the functional areas, if such rules are indicated by or included in the second code. Increasing the pen's knowledge of the functional layout of the product may also reduce the need to distribute functional layout data for pre-storage in other parts of the information management system, since such data may be directly inferred from the pen data output.

The input data may comprise relay data which indicates a receiving device to the pen. Thus, the pen may provide its output data directly to this receiving device. Alternatively, the pen may include the relay data in its output data, so that this output data can be relayed to the appropriate address in the information management system.

The input data may comprise usage limitation data which restricts the pen's processing of the position data. Thus, usage of the product can be controlled by the provider of the second code.

The input data may comprise security data which allows the pen to encrypt the position data, to provide for secure transfer of output data from the pen to a receiving device.

The input data may supplement or even replace the data which is provided to the pen in the roundtrip communication of the prior art system. Thus, the roundtrip communication may be dispensed with, and the position data recorded by the pen may instead be handled asynchronously within the information management system. In one such embodiment, the pen incorporates output data into a data file object suitable for storage in a file system, and exposes the data file object to an external data handler. Such a data file object can be transported in the system in a sequential chain of transfers, with each transfer being independent of other transfers. Thus, certain parts of the chain may be temporarily inoperable without the output data being lost in the system. It should be noted that the present invention also allows for streamlined and transparent flow of data, by proper design of the external data handler and any other components involved in the transfer operations.

The data exposure may involve the data file object being pushed to the external data handler, or the data file object being made available for retrieval (pulling) by the external data handler, suitably from a file system in the memory of the pen. The exposure by pushing requires the external data handler to be active, while any other components of the system may be off-line. The exposure for retrieval may be effected while all other components of the system are off-line.

Corresponding advantages may be achieved by other aspects of the invention. One such aspect is a method in an electronic pen, comprising: importing non-position data via an import interface of the pen; storing the imported non-position data in a memory of the pen; determining position data in a predefined coordinate system, during movement of the electronic pen on a product; and processing the position data on the basis of the stored non-position data. Another such aspect is an electronic pen, comprising: a memory; an importer which is operable to import non-position data via an import interface of the pen and store the imported non-position data in the memory; a positioner which is operable to determine position data in a predefined coordinate system, during movement of the electronic pen on a product; and processing logic which is operable to process the position data on the basis of the stored non-position data.

Still other objectives, features, aspects and advantages of the present invention will appear from the following detailed disclosure, from the attached dependent claims as well as from the drawings.

BRIEF DESCRIPTION OF THE DRAWINGS

The invention will now be described in more detail with reference to the accompanying schematic drawings.

DETAILED DESCRIPTION OF THE INVENTION

Abstract Pattern

Figure 1:
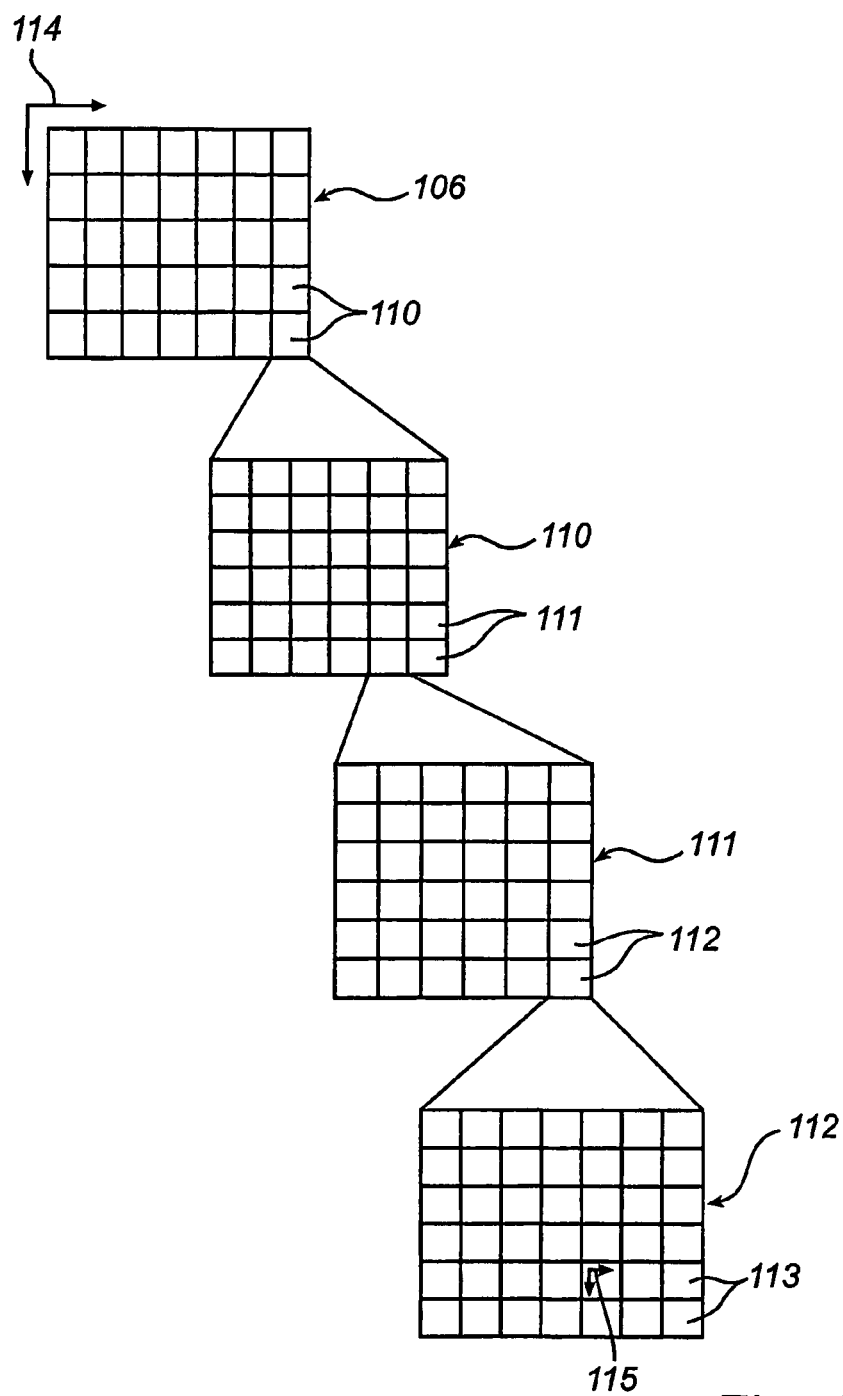
FIG. 1 illustrates a logical division of an abstract position-coding pattern into a tree structure of addressable page units.

The following description is based on the use of the above-identified abstract position-coding pattern which is divided into page units. The page units are individually addressable in a hierarchy of page unit groups. FIG. 1 shows an example, in which the pattern 106 contains "segments" 110 which in turn are divided into a number of "shelves" 111, each containing a number of "books" 112 which are divided into a number of aforesaid page units 113, also called "pattern pages". Suitably, all pattern pages have the same format within one level of the above pattern hierarchy. For example, some shelves may consist of pattern pages in A4 format, while other shelves consist of pattern pages in A5 format. The location of a certain pattern page in the abstract pattern can be noted as a page address of the form: segment.shelf.book.page, for instance 99.5000.1.1500, more or less like an IP address. For reasons of processing efficiency, the internal representation of the page address may be different, for example given as an integer of a predetermined length, e.g. 64 bits.

In one example, each segment consists of more than 26,000,000 pattern pages, each with a size of about 50×50 $cm^2$. In one embodiment, at least one such segment is divided into 5,175 shelves, each consisting of 2 books with 2,517 pages each.

Each pattern page may be regarded as an actual sub-set of the coding pattern, or as the absolute positions that are coded by the subset. Each such absolute position may be represented as a global position in the coordinate system 114 of the overall pattern, or as logical position, i.e. a page address and a local position in a coordinate system 115 within a pattern page.

A suitable electronic pen may record its motion on a position-coded product as either a sequence of global positions (i.e. a global pen stroke) or as a page address and a sequence of local positions on the corresponding pattern page (i.e. an addressed pen stroke).

The following description is also based on each product containing a position code that corresponds to one or more pattern pages. It is to be noted, however, that the position code on a product need not conform to a pattern page. Thus, one or more subsets from one or more pattern pages may be arbitrarily arranged on the product. The product also has embedded functionality in that the position code on the product is associated with one or more functions that selectively operate on electronic pen strokes that include certain positions.

Figure 4:
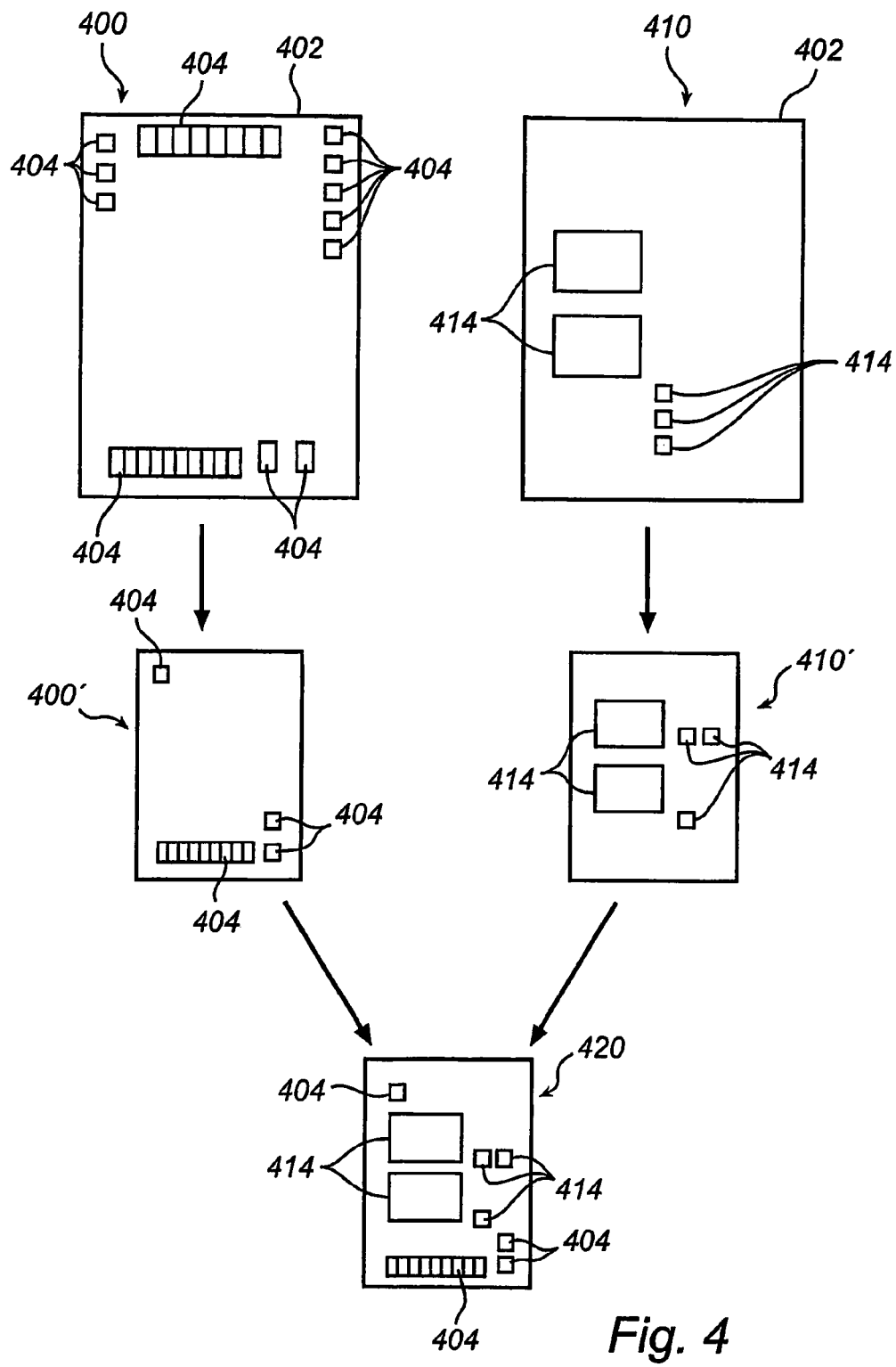
FIG. 4 illustrates the relation of a template definition and a page description to a final position-coded product.

Specifically, the functionality of the pen is at least partly controlled by the user manipulating the pen on a specific part of the position-coding pattern. To this end, the pen stores one or more templates that define how the pen is to operate on the information that is recorded from different parts (functional areas) of the position-coding pattern. In one embodiment, a specific page unit group in the page hierarchy, e.g. a segment or a shelf, is associated with a given template definition, which thus is valid for all pattern pages within that specific subset. The template defines the size, placement and function of any functional areas that may affect the operation of the pen. Such functional areas are denoted as "pidgets". FIG. 4 illustrates a template 400 as laid out on a pattern page 402, showing the placement of different pidgets 404.

In a template, all positions not occupied by any pidget within a pattern page are defined as belonging to a drawing area, which thus may be regarded as an implicit pidget. The positions detected in the drawing area are interpreted by the pen to be recorded as pen strokes.

The pidgets may, i.a., indicate a trigger function, a service selection function, a device selection function, a local action function, a data selection function, an interpretation function, or a feedback function. The trigger function triggers the pen to expose data, as will be further explained below. The service selection function identifies a service, which may convey context information (e.g. email, fax, SMS) that affects the pen's processing of recorded positions, and/or content information (e.g. page, book, shelf) that affects the pen's selection of positions to be processed. The device selection function identifies a connection device for the pen (e.g. PC, mobile device, LAN access point). The local action function initiates an action that affects pen memory. The data selection function maps recorded positions to pen-resident data; e.g. a keyboard pidget may map positions to characters in the pen memory, or a shortcut pidget may map positions to communication addresses in the pen memory. The interpretation function may operate to convert one or more strokes within the pidget to machine-coded characters. The feedback function may cause the pen to activate an internal MMI, such as a vibrator, display or speaker.

Another type of pidget indicates a new instance function, which operates to separate potentially overlapping pen strokes by associating each pen stroke with an instance identifier. For example, each initiation of a new instance function may result in a new instance identifier being generated for the relevant part of the abstract pattern, such as a pattern page or book, and any subsequently recorded pen strokes may then be associated with this instance identifier. The instance identifier is suitably associated with or incorporated in the page address.

In one embodiment, the template defines each pidget 404 by a pidget ID, and a size and placement in local positions within a pattern page 402 (FIG. 4). The pidget ID is a 16-bit identifier that determines the pidget function. The pidget ID consists of a pidget type (bits 8-15) and a pidget number (bits 0-7). The pidget type identifies the above-mentioned function, and the pidget number may identify a subfunction.

The above-mentioned trigger pidget can be either specific or generic. A specific trigger pidget has a pidget ID that identifies, via the pidget number, both a specific connection device and a specific service. Whenever the pen records a position within such a specific trigger pidget, it is capable of effecting an exposure of data. A generic trigger pidget has a pidget ID that does not identify a specific connection device and/or a specific service. To trigger an exposure of data, the generic trigger pidget must be used in combination with a device selection pidget and/or a service selection pidget, by the pen recording corresponding positions and forming a trigger pidget ID which identifies both a valid service and a valid connection device.

Electronic Pen

Figure 2:
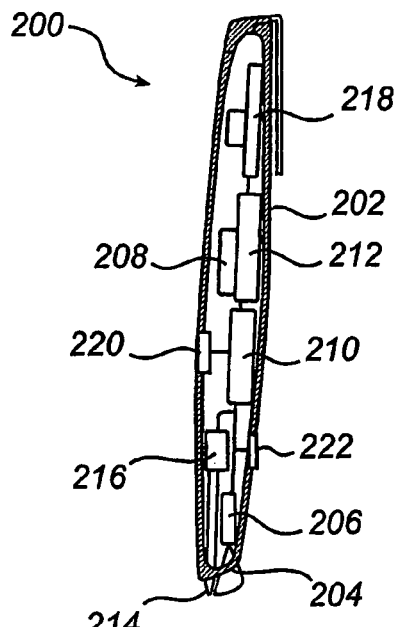
FIG. 2 is a cross-sectional view of an electronic pen that implements the principles of the present invention.

FIG. 2 illustrates an embodiment of the above-mentioned pen 200, which has a pen-shaped casing or shell 202 that defines a window or opening 204, through which images are recorded. The casing contains a camera system, an electronics system and a power supply.

The camera system 206 comprises at least one illuminating light source, a lens arrangement and an optical image reader (not shown in the Figure). The light source, suitably a light-emitting diode (LED) or laser diode, illuminates a part of the area that can be viewed through the window 204, by means of infrared radiation. An image of the viewed area is projected on the image reader by means of the lens arrangement. The image reader may be a two-dimensional CCD or CMOS detector which is triggered to capture images at a fixed rate, typically of about 70-100 Hz.

The power supply for the sensor device is advantageously a battery 208, which alternatively can be replaced by or supplemented by mains power (not shown).

The electronics system comprises a control unit 210 which is connected to a memory block 212. The control unit 210 is responsible for the different functions in the electronic pen and can advantageously be implemented by a commercially available microprocessor such as a CPU ("Central Processing Unit"), by a DSP ("Digital Signal Processor") or by some other programmable logical device, such as an FPGA ("Field Programmable Gate Array") or alternatively an ASIC ("Application-Specific Integrated Circuit"), discrete analog and digital components, or some combination of the above. The memory block 212 comprises preferably different types of memory, such as a working memory (e.g. a RAM) and a program code and persistent storage memory (a non-volatile memory, e.g. flash memory). Associated software is stored in the memory block 212 and is executed by the control unit 210 in order to provide a pen control system for the operation of the electronic pen.

The casing 202 also carries a pen point 214 which allows the user to write or draw physically on a surface by an ordinary pigment-based marking ink being deposited thereon. The marking ink in the pen point 214 is suitably transparent to the illuminating radiation in order to avoid interference with the opto-electronic detection in the electronic pen. A contact sensor 216 is operatively connected to the pen point 214 to detect when the pen is applied to (pen down) and/or lifted from (pen up), and optionally to allow for determination of the application force. Based on the output of the contact sensor 216, the camera system 206 is controlled to capture images between a pen down and a pen up. The control unit 210 processes these images to generate a sequence of temporally coherent positions that electronically represent a pen stroke.

The electronics system further comprises a communications interface 218 for exposing data, as will be further described below, to a nearby or remote apparatus such as a computer, mobile telephone, PDA, network server, etc. The communications interface 218 may thus provide components for wired or wireless short-range communication (e.g. USB, RS232, radio transmission, infrared transmission, ultrasound transmission, inductive coupling, etc), and/or components for wired or wireless remote communication, typically via a computer, telephone or satellite communications network.

The pen may also include an MMI (Man Machine Interface) 220 which is selectively activated for user feedback. The MMI may include a display, an indicator lamp, a vibrator, a speaker, etc.

Still further, the pen may include one or more buttons 222 by means of which it can be activated and/or controlled.

Information Management System

Figure 3:
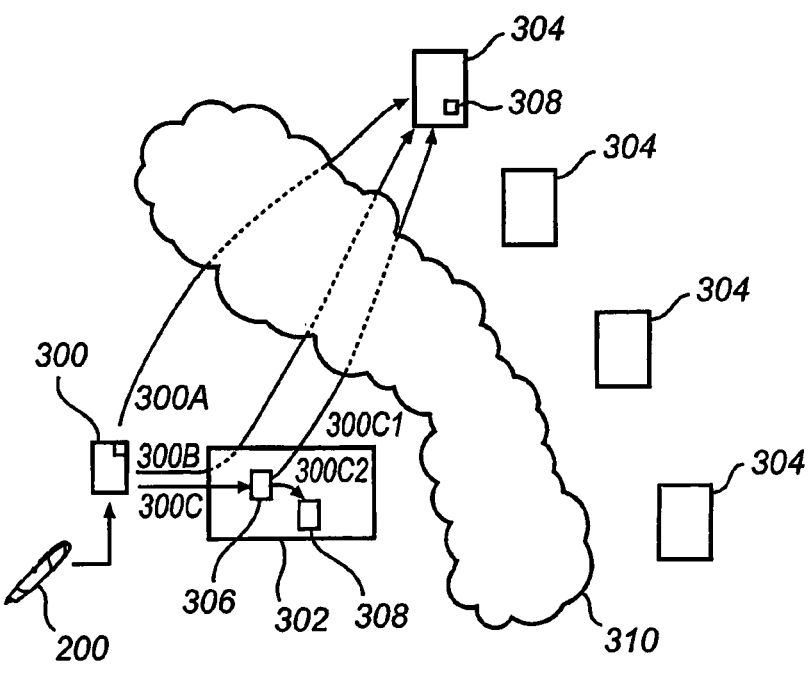
FIG. 3 is an overview of an information management system, and communication paths therein, in which a file object may be generated and exposed for transfer according to the present invention.

FIG. 3 is an overview of an information management system in which the present invention may be used. As will be further explained below, the pen 200 incorporates pen stroke data in a file object 300 which is exposed to other components of the system. In one embodiment, the file object 300 is pushed to a given local or remote receiving device 302, 304, as indicated by paths 300A-300C in FIG. 3. Path A is set up directly between the pen 200 and the remote device 304, via a communication network 310. Path 300B is set up from the pen 200 to the remote device 304 through the local device 302 and via the network 310. Path 300C is set up between the pen 200 and the local device 302. In another embodiment, the file object 300 is exposed to be pulled from the pen 200 by the receiving device 302, 304, along any one of paths 300A-300C.

The local or remote receiving device may include a flow controller 306 that relays the file object 300, or data derived therefrom, to an application program 308 that resides either locally on the receiving device or on a remote device, as exemplified by paths 300C1, 300C2. Examples of such flow controllers are given in aforesaid US 2003/0046256, and in WO 03/056420 and WO 03/105064. More than one flow controller may be involved in the data transfer from the pen to the application program.

The flow controller 306 may be arranged to relay appropriate data to a destination address, for example via HHTP (Hypertext Transfer Protocol) post, SMTP (Simple Mail Transfer Protocol), X.400, MMS (Multimedia Messaging Service), SMS (Short Message Service), database sync, etc. The destination address may be directly or indirectly given by relay data that the flow controller 306 extracts from the file object 300. In one embodiment, the flow controller thus extracts an explicit destination address from the file object. In another embodiment, the flow controller 306 extracts an address indicator from the file object and accesses a lookup table to derive a destination address based upon the address indicator. For example, the address indicator may be a page address, a global position, a pidget ID, a pen-resident parameter value etc. The appropriate data to be relayed may also be directly or indirectly given by the relay data. As an alternative to relaying the file object 300, the flow controller 306 may send a notification to the destination address that the file object 300 is available for retrieval.

Upon receipt of the file object 300, or the data derived therefrom, the application program 308 may access a page description that defines the originating physical product, i.e. the product from which the position data in the file object 300 originates (indicated by reference numeral P in FIG. 3). The page description defines the layout of the originating product P. Layout includes both the physical layout and the functional layout of the product. The physical layout includes supporting graphics, i.e. human-understandable information aimed at instructing, controlling and/or informing a user. The functional layout defines the placement and size of any so-called user areas on the relevant pattern page(s). A user area is an application-specific functional area, with a placement, size and function that may be unique to the specific application program 308. In the page description, each user area may be assigned an identifier of a dedicated processing instruction, which is accessible to the application program. Alternatively, each processing instruction may be included in the page description. The physical layout may also be included in the page description, either as explicit instructions for generation of the physical layout, or as an indicator of a storage address of a computer file that defines the physical layout.

The structure, functionality and use of page descriptions are further described in US 2002/0040816 and WO 03/105064.

FIG. 4 further illustrates the interrelation between pattern page 402, template 400, page description 410 and physical product 420. The physical product 420 includes a position code (not shown) that defines positions within one or more pattern pages 402 (only one shown in FIG. 4). These positions are associated with one or more functions, which are either predefined in the system (for pidgets 404) or application-specific (for user areas 414). The pidgets 404 have a predefined placement and size within the pattern page 402, but may have any placement on the physical product 420. The page description 410 defines the placement, size and function any additional user areas 414 on the pattern page 402, as well as the physical layout of the product 420. Thus, the product 420 contains one functional layout part 400' given by the template 400 and one functional layout part 410' given by the page description 410.

The pen stroke data in the file object 300 (FIG. 3) is self-supporting, i.e. the receiving application program 308 is able to access and process the data without any need for communication with the pen 200 that created the data. Thus, in contrast to the prior art, the pen 200 outputs data asynchronously, i.e. without any roundtrips in the information management system.

The file object 300 may be generated by the pen 200 in different levels of refinement. For example, the file object 300 may contain any one of the following, or combinations thereof:

(1) raw pen stroke data, i.e. the temporally coherent sequences of global or logical positions that make up the pen strokes;

(2) a picture of the pen strokes, i.e. an image that directly represents the recorded positions;

(3) refined pen stroke data, typically template-related information such as identifications of any pidgets touched by the pen strokes and/or the results of the functions associated with such pidgets;

(4) scrambled and/or encrypted pen strokes, for example to prevent unauthorized processing or distribution of the pen-generated data in the information management system. In one example, the page address may be manipulated according to a predetermined algorithm or eliminated from the pen strokes; and (5) indications of all user areas touched by the pen strokes and/or the results of the functions associated with such user areas.

The file object 300 may, in any one of the refinement levels, contain additional pen- or stroke-related data, such as timestamps of the positions in the pen stroke and of any pidgets, force values of the positions in the pen stroke, and any pen-resident parameter(s). The timestamps will allow the application program or the flow controller to combine strokes and/or pidgets based on their mutual time of recording. Each timestamp reflects the time when the originating image of a position/pidget was captured by the pen camera system 206 (FIG. 2). The force values will allow the application program to render an image of the strokes with force-dependent line width.

The pen-resident parameters are stored in the memory block 212 (FIG. 2) to identify a characteristic of the pen itself or of the owner/user of the pen. These parameters may be used by the receiving application program 308 (FIG. 3), and may thus be at least selectively included in the file object 300. The inclusion of a pen-resident parameter may be decided by the page address(es) of the strokes in the file object, and/or by the above-mentioned context or content information. The pen-resident parameters may include: a unique identifier of the pen, a language identifier, a name, a street address, an electronic mail address, a phone number, a pager number, a fax number, a credit card number, etc.

The file object 300 may be either character-encoded or non-character-encoded (e.g. binary), and may be in any suitable format. The file format may be proprietary or standardized, for example XML (Extensible Markup Language), HTML (Hypertext Markup Language), XForms, PDF (Portable Document Format), etc.

Pen Control System

The pen 200 operates by software being executed in the control unit 210 (FIG. 2). The overall software architecture will now be described with reference to FIG. 5 which illustrates some main software components.

The pen system software is based on modules. A module is a separate entity in the software with a clean interface. The module is either active, by containing at least one process, or passive, by not containing any processes. The module may have a function interface, which executes function calls, or a message interface, which receives messages. The active and passive modules are basically structured as a tree where the parent to a module is responsible for starting and shutting down all its children.

The pen system software also implements an event framework to reduce dependencies between modules. Each module may expose a set of predefined events that it can signal. To get a notification of a particular event, a module must be registered in an event register. The event register may also indicate whether notification is to take place by posting a message, or as a callback function.

The pen system software has two basic functions: store what the pen writes, and upon request expose the recorded information, which may or may not be subjected to a refining step before the exposure.

A combination of software modules implements a so-called coordinate pipeline 502, which is a flow of events for storage of strokes. A stream of global positions from an Image Processing module 504 is received by a Translator module 506, which converts the global positions to logical positions. If the Translator module 506 detects a stroke passing through a pidget, a corresponding pidget event is triggered. The pidget event causes appropriate action in other software modules, by these modules including an event listener that determines the respective relevance of the pidget event. The addressed pen strokes are then received by a Coordinate Manager module 508, which assembles them to addressed pen strokes that are encoded in a compact representation and stored in the memory block 212 (FIG. 2).

1. Supervisor

Figure 5:
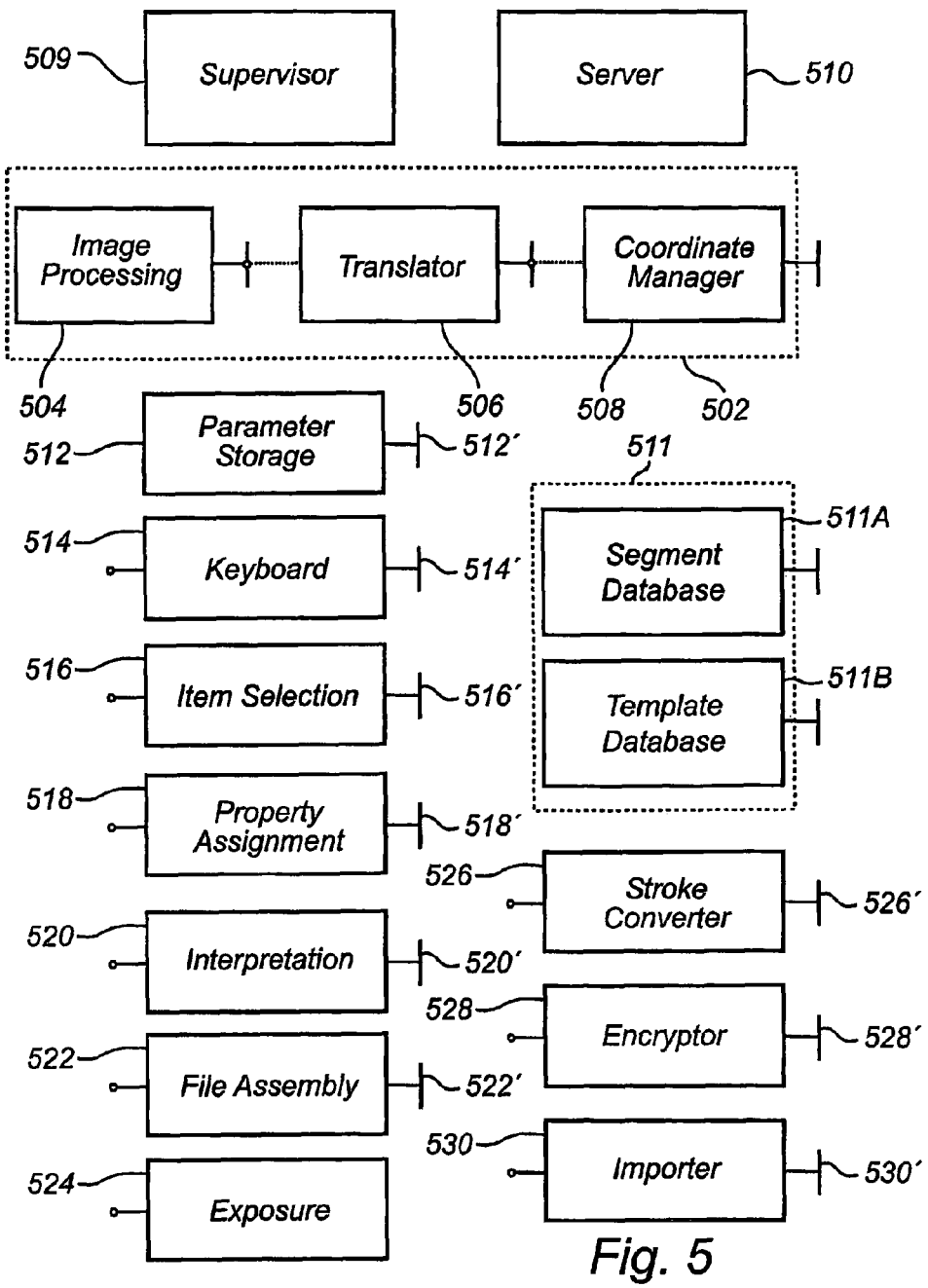
FIG. 5 illustrates an embodiment of a system of software modules for controlling the operation of the pen in FIG. 2.

As shown in FIG. 5, the pen system software includes a Supervisor module 509 which directly or indirectly initiates all other modules. The Supervisor module 509 includes an interface to the event register, so that modules can register themselves on the events they want to receive. The Supervisor module 509 also generates control events that are available to the listeners in other software modules.

2. Server

A Server module 510 is provided as a coordinator of events in the pen. It makes decisions what the pen should do based on the state of the system and incoming events.

3. Image Processing

The Image Processing module 504 will not be further described herein. It can for example be implemented according to Applicant's prior publications: US 2003/0053699, US 2003/0189664, US 2003/0118233, US 2002/0044138, U.S. Pat. Nos. 6,667,695, 6,732,927, US 2003/0122855, US 2003/0128194, and references therein.

4. Position Database

The pen includes a position database 511 which resides in the memory block 212 (FIG. 2) of the pen and which can be edited or updated via the communications interface 218 (FIG. 2). The position database 511 is used by the Translator module 506 and contains a segment database 511A, which associates each segment with a template, given by a template index. The segment database 511A is suitably cached in a RAM memory for fast access. The position database 511 also contains a template database 511B which associates the template index with a pointer to a template definition, which may be stored as a parameter in non-volatile memory in the pen. Such a template definition may contain: Page X Size (16 bits), Page Y Size (16 bits), Number of pages (16 bits), Number of pidgets (16 bits), Pidget List (Number of pidgets long). The pidget list consists of a number of pidgets. Each pidget may be defined by: a pidget ID (16 bits, upper eight is Type, lower eight is Number), X upper left coordinate (16 bits), Y upper left coordinate (16 bits), Width (16 bits), Height (16 bits).

5. Translator

The above-mentioned Translator module 506 uses an algorithm that is based on known pattern formatting data to translate the global positions to logical positions. The pattern formatting data defines the hierarchical division of the coding pattern into pattern pages (FIG. 1). Part of the pattern formatting data may be pre-stored in the pen, while other parts may be dynamically derived from the position database 511 in the pen. For example, if all segments have a predetermined size, a global position may be processed to identify the current segment of this global position. Knowing the current segment, data on its division may then be derived from its template definition in the position database 511, whereupon the global position may be further processed to identify the current shelf, book, page, and local position, i.e. a full logical position. If the pen usually is operated on one and the same pattern page for some time, major speedup may be achieved by caching the boundaries of the current pattern page in global positions, and by checking any new global position against these boundaries. As long as the new global positions fall within the boundaries, the need for a recalculation of the page address is eliminated.

The Translator module 506 also detects if any recorded positions fall within a pidget on the current pattern page, by mapping the local positions against the relevant template definition, given by the position database 511. In one embodiment, only one pidget can be identified for each stroke, i.e. if several pidgets are identified, only the last pidget is considered. A corresponding pidget event is then generated for notification to other software modules. If no pidget is identified, the position is assumed to fall within a drawing area.

Thus, for each global position, the Translator module 506 provides at least a page address and a local position. For each temporally coherent sequence of positions, i.e. a stroke, the Translator module 506 may also provide a pidget ID. Each logical position is also associated with a timestamp, given by a timing circuit of the control unit 210 (FIG. 2), and a force value, given by the contact sensor 216. Similarly, each pidget ID is associated with a timestamp. The Translator module 506 may also have an interface which allows other modules to look up information in the position database 511 about templates and pidgets.

6. Coordinate Manager

The Coordinate Manager module 508 receives the logical positions from the Translator module 506. Before storage, it groups the logical positions into temporally coherent sequences, i.e. strokes. This may alternatively be done by the Translator module 506. The Coordinate Manager module 508 may then preprocess each stroke for compression and store the result in non-volatile memory. Examples of such compression and storage are given in US 2003/0123745 and US 2003/0122802.

The Coordinate Manager module 508 also contains an interface for other modules to search for stored strokes, e.g. based on page address, and to retrieve strokes in a transport format. In one embodiment, the transport format is binary and includes the following data: a session identifier, a start time for each stroke, local positions in each stroke, and a force value for each position. Optionally, the transport format may include orientation data which is calculated from the captured images to indicate the three-dimensional orientation of the pen during the recording of positions.

The session identifier is indicative of the pen working session during which the different sets of pen strokes have been input. For example, the session identifier may be a 32-bit signed integer value which is incremented each time the pen is switched on. The session identifier may be used by the application program 308 (FIG. 3) to reset any properties selected during a preceding working session, as will be described further below.

7. Parameter Storage

The pen system also includes a Parameter Storage module 512. All other modules that have a need for keeping a state after pen shutdown call this module to store their state parameters. The Parameter Storage module 512 also handles pen-resident parameters set in production, such as unique pen parameters (pen identifier, etc.) or calibration parameters, as well as the template definitions. Each parameter is stored with name, size and data in non-volatile memory. The module 512 provides an interface 512' for insertion, retrieval and deletion of parameters.

8. Keyboard

A Keyboard module 514 is included to enable text input to the pen. The template database 511B includes a specific control template which includes a keyboard pidget. The control template is defined for a range of pattern pages (e.g. segment, shelf or book), with a different language being assigned to the keyboard pidget on different pages. For reasons of memory-efficiency, the mapping of each keyboard key to a specific character resides in non-volatile memory, with different languages being assigned to different page address within the range of pattern pages. The keyboard module listens to paper events, and upon a keyboard pidget event it calculates what key has been hit and loads, based on the current page address, the appropriate letter from the memory. An interface 514' allows other modules to access the resulting letter(s).

9. Item Selection

A Item Selection module 516 is implemented to allow the pen user to select items from the pen memory with the pen. The template database 511B includes one or more dedicated pidgets that are associated with items in the pen memory. Such an item could for example be an address record in a pen-resident address book. To select an item, the user ticks the corresponding pidget. The Item Selection module 516 is implemented to listen for related pidget events. Upon detection of such an event, it extracts the associated item and manages it in a bit vector internally. Other modules can then access the item through an interface 516'.

10. Interpretation

An Interpretation module 520 is provided to interpret pen strokes. The interpretation module 520 is implemented to listen to related pidget events. Upon detection of such an event, it operates an interpretation function on the stroke associated with the event to produce an output item. Optionally, several strokes may be grouped, for example based on their location to the pidget, before the interpretation process. The interpretation function may for example convert the stroke(s) into machine-coded characters. The interpretation may be executed in a certain context (e.g. email, fax, SMS), given by the above-mentioned service identifier. Further, the interpretation function may be supported by a pen-resident dictionary, such as the above-mentioned address book. An interface 520' allows other modules to access the result of the interpretation.

11. Property Assignment

A Property Assignment module 518 is provided to create a property table, which is a supporting data structure containing the properties that have been assigned to pen strokes by the user, suitably by the user bringing the pen to touch one or more property selection pidgets. Such properties may operate on the strokes that are temporally adjacent to the property selection event, i.e. preceding and/or following strokes, depending on implementation. The property table may include indications of all property values given by the ticked property selection pidgets, as well as an associated timestamp.

Thus, the Property Assignment module 518 is implemented to listen for related pidget events. Upon detection of such an event, it extracts the associated pidget value from the template database 511B, and adds the pidget value to the property table.

The property may generally relate to instructions for the processing of strokes, or for the processing procedure itself. The property value may indicate a visual quality such as color, line thickness, line character, temporal resolution, or spatial resolution. Further, the property value may indicate a desired interpretation context (characters, digits, lower-case characters, upper-case characters, email address, fax number, bank account number, etc). In still another alternative, the property value indicates a page format parameter such as page break, page columns or page margins. Moreover, the property value may serve as an "access-granting" indicator to declare that various externally stored personal data (e.g. social security or personal number, telephone number, bank account number) may be used as input data when processing a certain set of pen strokes.

The property table allows the application program 308 (FIG. 3) to easily derive and apply the identified property values to the pen strokes. Thus, the application program does not need to match the pen strokes to a template definition to derive the selected property values, if any. Instead, the application program may directly apply the property values in the property table, by matching the property values to the pen strokes, based on the respective timestamps. This matching may also take into account the above-mentioned session identifier, which is included in the strokes as represented in the above-mentioned transport format. Thus, each time the session identifier changes in the stroke data, all properties are reset to their default values. As an alternative or complement to being included in the stroke data, the session identifier may be included as a timestamped item in the property table.

12. File Assembly

A File Assembly module 522 is implemented to generate the file object 300 (FIG. 3) to be exposed to data handlers outside the pen. The module 522 is implemented to listen for a dedicated event, such as a trigger pidget event. Upon detection of the dedicated event, it retrieves from the Coordinate Manager module 508 the strokes associated with the trigger pidget, in binary transport format.

Evidently, the functionality of the File Assembly module 522 will depend on the level of refinement. The above steps are sufficient for level 1 refinement, as defined above.

For level 3 refinement, the module 522 may retrieve data items from other modules, given by other pidgets associated with the trigger pidget. Such data items may be retrieved from the Keyboard module 514, the Item Selection module 516, the Property Assignment module 518, and the Interpretation module 520. If necessary, the module 522 also combines such data items, for example characters from the Keyboard module 514, or output items from the Interpretation module 520. Finally, the module generates the file object 300 (FIG. 3), which is made available to other modules via an interface 522'.

Such a file object may for example have the following structure:
File Header (Trigger Pidget ID, Page Address, Number of pages, Number of properties)
  Page data header (Page Address, Number of pidgets)
  Page data (Stroke data in transport format)
  Pidget data (Pidget ID(s), Timestamp(s))
  Property data (Pen-resident parameter value(s),
Output item from Keyboard, Output item from Item Selection, Output item from Interpretation, Property table from Property Assignment)

The file object allows the application program 308 (FIG. 3), and optionally the flow controller 306, to identify and extract all or selected parts thereof.

The generation of a file object in refinement levels 2, 4 and 5 will be further described below in sections 14. Stroke Converter, 15. Encryptor, and 16. Importer, respectively.

The selection of strokes to be included in the file object may be determined from the content information that is included the trigger pidget ID. Such content information may, for example, indicate the current pattern page or book, i.e. the selected strokes should belong to the same page unit group as the trigger pidget. Clearly, there are alternative ways of selecting strokes. For example, strokes may be selected from within a bounding area defined by dedicated pen strokes (i.e. the pen is moved on the product to indicate to the pen what to expose). In another example, all strokes in the pen memory are automatically selected for exposure, suitably with one file object being created for each pattern page or book. Optionally, strokes may be selected with respect to a time reference, for example the time for the last exposure of data.

All the thus-selected strokes may be incorporated as strokes in the file object. Alternatively, only those strokes that are not represented as pidgets and/or property data are incorporated as actual strokes in the file object.

The File Assembly module 522 may also be implemented to insert freestanding data in the file object, the freestanding data being related neither to the pen strokes recorded by the pen, nor to the pen itself. Instead of being inserted, the freestanding data may be associated with the file object, e.g. by the file object including a pointer to another file object with such data.

The freestanding data may include any kind of non-position data, which may be derived by a sensor in the pen or be received by the pen via the communications interface 218 (FIG. 2). In one example, the freestanding data is input by the same image sensor that captures the images used for position determination. In another example, it is input by an auxiliary image sensor in the pen. Such freestanding data may be in the form of one or more images (i.e. still or moving images), or of data extracted from such images (e.g. data decoded from bar codes or any other machine-readable codes, or machine-coded text resulting from optical character recognition (OCR) processing). In yet another example, the freestanding data may be audio data recorded by an audio sensor in the pen.

The File Assembly module 522 may be triggered to connect the freestanding data to the file object by an event which may be generated by the Translator module 506 identifying a dedicated pidget in the stream of coordinates or by the Interpretation module 520 detecting one or more pen strokes forming a dedicated command. Alternatively, the event may be generated by the pen system detecting a button 222 (FIG. 2) on the pen being pressed, by the pen system detecting a dedicated audio command (e.g. via a microphone in the pen), or by the pen system detecting receipt of a specific parameter value, a dedicated flag bit(s) or the like in data received on the communications interface 218 (FIG. 2).

In one user scenario, the user may move the pen across a bar code on a product. A software module in the pen identifies and decodes the bar code according to a suitable extrinsic standard, such as EAN or UPC, e.g. into a product identification number. The user may then command the pen to create and expose a file object including the product identification number and any position data recorded on the product or another product. The file object may, e.g., be used to communicate the product identification number for order placement, purchase or information retrieval via the information management system. In yet another alternative, the product identification number is used to identify the position-coded product in the information management system, i.e. to replace or supplement the above-mentioned page address.

In another user scenario, the user commands recording of audio, via a microphone in the pen or in an attachment to the pen, optionally synchronously with writing with the pen on a position-coded product. The user may then command the pen to create and expose a file object including the audio recording and any position data recorded on the product. The file object may, e.g., be used to form an audio-augmented note-taking record, or to form a combined audio and written message to be communicated to a recipient via the information management system.

In still another user scenario, the user commands recording of a digital photograph or a video sequence, by means of an image sensor in pen or in an attachment to pen. Again, the user may command the pen to create and expose a file object including the photograph or video recording and any position data recorded on a product. The file object may, e.g., be used to create a multimedia message or electronic postcard to be communicated to a recipient via the information management system.

In yet another variant, the freestanding data includes at least part of aforesaid relay data, preferably in the form of an explicit address of an intended recipient in the information management system, such as the receiving device 304 that hosts the relevant application program 308 (cf. FIG. 3).

13. Exposure

An Exposure module 524 is provided to expose the collected data to data handlers outside the pen. The module is implemented to listen for a dedicated event, such as a trigger pidget event. Upon detection of the dedicated event, it retrieves the file object from the File Assembly module 522, and exposes the data file object, either by pushing the file to a specific device/port, given by the device identifier, or by allowing an external data handler to pull the file object from the pen. For example, the file objects may be stored in a file system in the pen memory, the file system being exposed to the external data handler. For example, the file system may be exposed for browsing via USB (Universal Serial Bus), FTP (File Transfer Protocol), HTTP (Hypertext Transfer Protocol) or any other suitable protocol.

The Exposure module 524 contains all necessary protocol stacks, and is designed to be independent of transmission means, by the responsibility of setting up a link being assigned to a separate module and by working with device abstractions. The responsibility of setting up the link has been assigned to a Link Selection module (not shown). The Link Selection module handles the selection and setup of a communication link, for example when the pen is to execute an exposure of a data file object.

In one embodiment, the Exposure module may switch between an asynchronous mode, with exposure of an autonomous file object, and a conventional synchronous mode, with on line end-to-end communication of data. The mode may be indicated by the event that triggers the exposure.

14. Stroke Converter

For level 2 refinement, the pen system may include a Stroke Converter module 526 which transfers a given set of strokes to a picture buffer in the memory block 212 (FIG. 2), and a picture encoder which encodes the picture buffer to an image of a given type, for example a bitmap format or a vector graphics format. The Stroke Converter module may also be implemented to apply any properties assigned by the Property Assignment module 518 to the strokes during the image conversion procedure. For example, it may build a timestamped table with all visual quality changes detected by the Property Assignment module 518, and apply the changes to the strokes while transferring the strokes to the picture buffer.

15. Encryptor

For level 4 refinement, the pen system may include an Encryptor module 528 that processes all or selected parts of the file object according to a predetermined encryption algorithm, to generate an encrypted file object. Alternatively or additionally, the Encryptor module may eliminate or scramble the page address of all or a subset of the strokes. For example, the elimination/scrambling operation may be applied only to strokes from certain page addresses.

16. Importer

As mentioned above, non-position data may be imported into the pen via a sensor in the pen or via the communications interface (218 in FIG. 2). For example, the sensor may be an audio sensor, e.g. a microphone, or an image sensor, either the primary sensor producing images for position determination or an auxiliary sensor.

The pen system may thus include one or more Importer modules 530. Such an Importer module may be dedicated to a specific means of import, such as image sensor data, audio data or communications interface data. Alternatively or additionally, such an Importer module may be dedicated to handling a particular type of data, such as machine-coded text, data associated with a bar code or another specific type of machine-readable code, photographic data, video sequence data, etc.

Below, a particular type of Importer module will be described in more detail, namely a Definition Importer module.

Such a Definition Importer module is capable of importing into the pen system, definition data that defines all or some functional areas on one or more specific pattern pages. The definition data may correspond to the above-mentioned template definition, or may be the above-mentioned page description that identifies user areas on the pattern page, or any combination or subset thereof.

As will be described further below, such definition data may allow the pen to be operated with more advanced user feedback/control, as well as to provide a file object in refinement level 5.

The Definition Importer module may be arranged to import the definition data, automatically or on command, via the communications interface (218 in FIG. 2) of the pen. For example, the pen may connect to a local device (302 in FIG. 3) which retrieves the definition data, from internal memory or from a dedicated network server, and provides this definition data to the pen. Alternatively, a definition data kit may be provided to the pen user on a CD ROM, floppy disk, USB memory, etc, or via downloading from an Internet site. After proper installation in a local device communicating with the pen, the local device is capable of providing the definition data kit, or selected parts thereof, to the pen. In yet another alternative, the pen may connect to a dedicated server on a communication network, from which the Importer module derives the definition data. It is also conceivable that the definition data is provided in a memory unit which is removably installed in the pen to be accessed by the Importer module. The memory unit may be in the form of a card or a cartridge of any known type, such as SD card, CF card, SmartMedia card, MMC, Memory Stick, etc. In all of these embodiments, the definition data is typically imported in a specific upgrade session which results in the definition data being stored in pen memory. The pen is then operable on all pattern pages that are supported by the thus-imported and stored definition data.

In one specific embodiment, however, the pen is capable of inferring such definition data from the recorded images.

Figure 6:
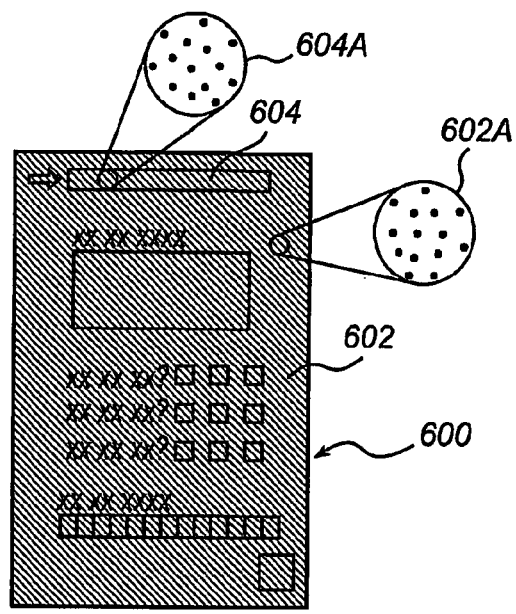
FIG. 6 is a view of a position-coded product with a definition code that holds meta data related to the product itself and the processing of positions recorded on the product.

To this end, as indicated in FIG. 6, a product 600 may be provided with both a position code 602 (enlarged at 602A) and a definition code 604 (enlarged at 604A). The definition code 604 codes definition data that may apply to a specific pattern page or a range of such pages, for example a book or a shelf. The definition data suitably includes an identifier of the applicable pattern page(s), for example in the form of one or more page addresses.

In a typical user scenario, the user moves the pen across the definition code to input a relevant template definition or page description for a certain product. The definition code may be provided either as integrated with the product or as separate from the product, and may be input to the pen either before, during or after recording of position data from the product.

The use of a definition code makes it possible to add a template definition or page description to the template database (511B in FIG. 5) of the pen. Thus, the pen only needs to pre-store, in the position database, the pattern formatting data that defines the size and placement of a specific subset of the abstract pattern, such as a segment, shelf, book or page. All information about placement and function of pidgets and user areas on the pattern page(s) within this subset may be included in the imported definition data.

With increasing awareness of user areas, the pen can be operated with more advanced control and/or user feedback. For example, the pen may signal that a position falls within a certain user area, via activation of the MMI (220 in FIG. 2). Further, the pen may be instructed, suitably by an instruction in the definition data, to block output of pen strokes on a pattern page until the pen has recorded pen strokes in a predetermined set of user areas on the pattern page. The pen may even be capable of verifying that the product, e.g. a single- or multi-page form, has been properly filled in.

Many different large-capacity codes are available to code the non-sequential definition data, such as two-dimensional bar codes or matrix codes. Further examples of suitable codes, and methods for their decoding, are given in Applicant's prior publications: US 2001/0038349 and US 2002/0000981, as well as in Applicant's U.S. provisional application 60/582,861, filed on Jun. 28, 2004.

Figure 7:
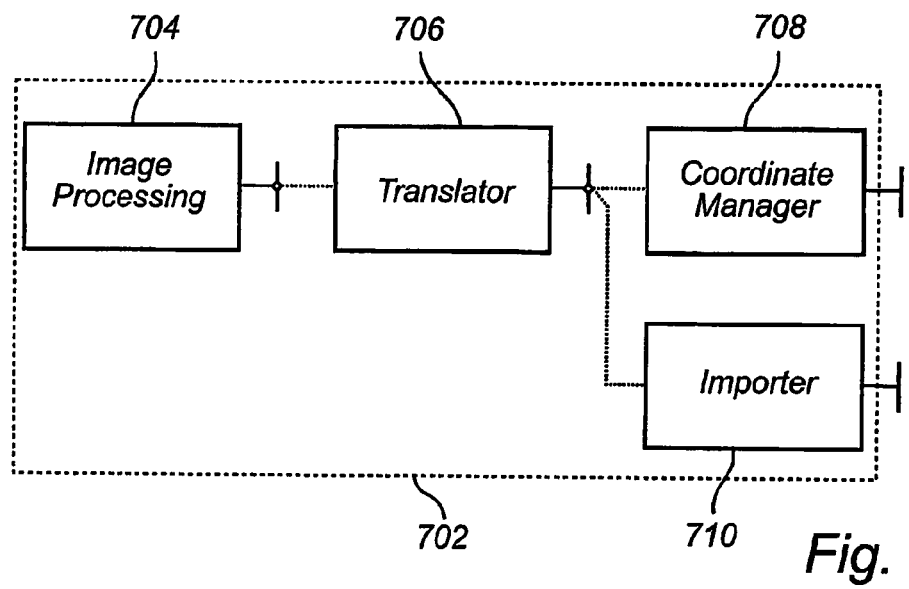
FIG. 7 illustrates part of a pen control system for processing of data from the product in FIG. 6.

To handle such definition codes, the pen system may be modified to implement a modified coordinate pipeline 702, as exemplified in FIG. 7. As is illustrated in FIG. 7, the pen system may include an Image Processing module 704, a Translator module 706, a Coordinate Manager module 708, and an Importer module 710. Here, the Image Processing module 704 is capable of processing the recorded images into a stream of positions or a stream of non-position data. The stream of non-position data is analyzed by the Translator module 706 which may identify the non-position data as definition data and issue a definition data event. Upon detection of such an event, the Importer module 710 may be implemented to build a template definition or page description from the definition data and store the result, indexed by the relevant page address(es), in the template database (511B in FIG. 5) or in a page description database, which is a part of the position database (511 in FIG. 5) dedicated to storage of page descriptions. The Importer module 710 may be arranged to intermittently process the template database/page description database to free memory capacity by eliminating records based on frequency of use, time since last use, etc.

It should be noted that the Translator module 706 may be implemented to match recorded positions against both the template database and the page description database. Thus, the Translator module 706 may output events indicative of user areas, in addition to pidgets.

Returning now to the level 5 refinement, the File Assembly module (522 in FIG. 5) may include in the file object an identifier of each user area hit by the pen strokes on one or more pattern pages. If the imported definition data also details the functions associated with the user areas, the pen system may be designed to process the pen strokes according to such imported definition data. In such a case, the File Assembly module may incorporate the results of such processing into the file object.

The File Assembly module may also include a definition of the physical layout, or parts thereof, in the file object. Such a definition may include an electronic representation of the physical layout, or a pointer to a storage location in the information management system, at which such an electronic representation is available.

In a specific embodiment, to make the file object more platform independent, the pen system may be arranged to render the physical layout as a set of pen strokes, and incorporate these fictitious pen strokes to represent the physical layout in the file object. Thus, one and the same algorithm can be used to extract and recreate the pen strokes and the physical layout from such a file object.

Additionally or alternatively, the File Assembly module may treat the definition data as freestanding data, which is wholly or partly included in or attached to the file object.

Figure 8:
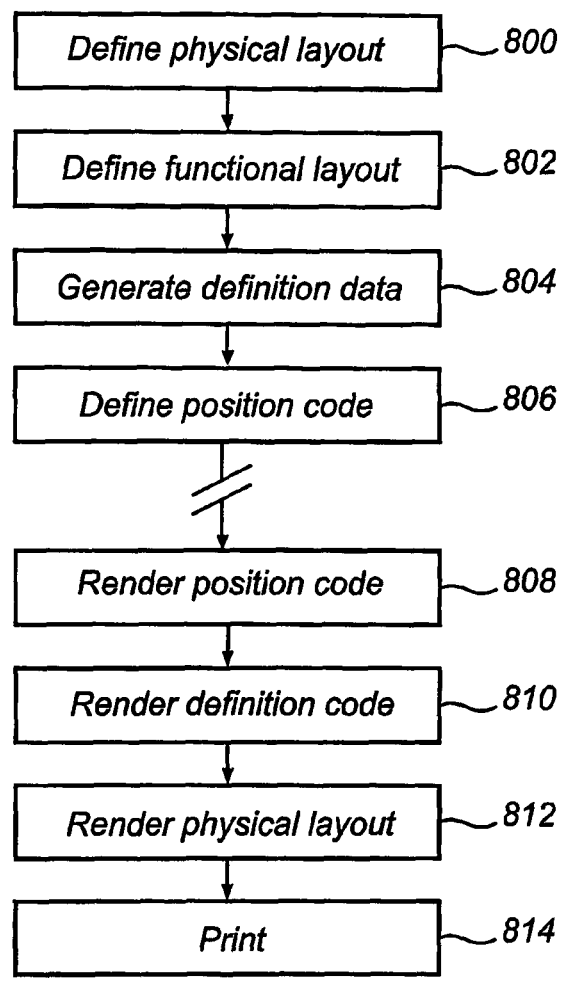
FIG. 8 illustrates steps effected by a tool for generation the position-coded product in FIG. 6.

The use of definition data and definition codes may allow for simple and expedient generation and use of coded substrates or products in an asynchronous information management system. A user may utilize a computer-based generation tool, such as the one disclosed in Applicant's prior publication US 2002/0040816, to create a suitable product. As shown in FIG. 8, the tool may be used to define both the physical layout and the functional layout of the product (steps 800, 802). The tool then generates the definition data that represents at least the functional layout of the product (step 804), and defines the position code to be printed on the product (step 806). Subsequently, the position code, the definition code and the physical layout is rendered (steps 808-812) for application to a substrate by means of a print engine in a printer (step 814). All or parts of such rendering may be effected in the tool or in the printer.

As noted above, the printed definition data may also represent the physical layout of the product, either as a background picture or as the full/original electronic representation of the supporting graphics, such as a word processing document, a presentation document, an electronic mail, etc. As another alternative, the physical layout may be defined in the form of a pointer to a storage location in the information management system, at which the physical layout is available in some form. In the latter case, the generation tool may prompt the user to select or identify the storage location before printout.

Alternatively or additionally, the pen system may include an Importer module which is arranged to import the above-mentioned relay data, automatically or on command. Such imported relay data may explicitly identify the destination address of an intended recipient in the information system, for example the receiving device (304 in FIG. 3) that hosts the relevant application program (308 in FIG. 3). The destination address may be given as a network address such as a URL (Uniform Resource Locator), an electronic mail address, an IP (Internet Protocol) address, etc.

By allowing the pen system to import an explicit destination addresses, the flow control in the information system may be simplified. In one example, the pen system may push the file object directly to the intended receiving device or application program. In another example, the pen system includes the explicit destination address in the file object, to allow any intercepting flow controller (e.g. 306 in FIG. 3) to operate directly on this address to relay the appropriate data to the intended recipient. Thus, the need for flow controllers to access the above-mentioned lookup tables is reduced.

Alternatively or additionally, the pen system may include an Importer module for usage limitation data. This data sets a limit to the pen system for the usage of particular position data recorded by the pen system. For example, the data may define the maximum number of times that position data may be recorded from the product, or the maximum number of times that such recorded position data may be transmitted from the pen. Alternatively, the data may define an expiration date after which the pen system is prohibited from recording position data from the products or transmitting such recorded position data. The use of an expiration date may require the pen's timing circuit to be synchronized with a common time reference in the information system.

The provision of usage limitation data allows for control of the use of coded products in the information system. Such control may be important for products representing an amount of money, such as checks, vouchers, gift certificates, tickets, etc. Usage control may also be important for applications with an inherent time deadline, such as examinations, tests, polls, surveys, voting, games and gaming, etc. Still further, by limiting the usage of products, a provider in the system may ensure future revenues since users must acquire new products to replace the expired products, or re-enable the expired products.

Alternatively or additionally, the pen system may include an Importer module for security data which may be used by the pen system to provide secure data transfer from the pen to a receiving device.

The security data may signal to the pen system that data should be encrypted. Further, if the Encryptor module (528 in FIG. 5) supports different encryption methods, the security data may include an identifier which identifies a specific encryption method to be used for encryption of data by the Encryptor module.

It should be noted that not all data in the file object need to be encrypted. In the event that the file object should be relayed by a flow controller (306 in FIG. 3), at least the relay data should be non-encrypted to be accessible to the flow controller. Likewise, any other data in the file object that is needed for decryption in the receiving device should be non-encrypted, as will be further explained below. In one embodiment, the imported security data defines at least partly the data to be encrypted.

The Encryptor module can use either symmetric or asymmetric encryption, or a combination thereof, to ensure at least confidentiality (the information is kept secret during transmission), but preferably also authentication (assuring the receiver that the identity of the sender of the information is not false) and/or non-repudiation (neither the sender nor the recipient of information is able to deny the transmission) of the transmitted information. The integrity (the information has not been altered during the transmission) of the information may also be guaranteed, suitably by using predetermined hash functions.

There are many available standard encryption algorithms that may be used, such as the Triple Data Encryption Standard (3-DES) algorithm, the Advanced Encryption Standard (AES) algorithm, the International Data Encryption Algorithm (IDEA), the Diffie-Hellman (DH) algorithm and the Rivest-Shamir-Adleman (RSA) algorithm. Further suitable encryption algorithms, and related methods, are disclosed in Applicant's publications US 2002/0034300, US 2003/0021419 and US 2003/0074562, which are incorporated herein by this reference.

Below, for the sole purpose of illustration, a few embodiments of the encryption process in the pen are described.

In a first embodiment, the pen system derives an encryption key, either by extracting the key from the imported security data or by operating a predetermined algorithm on a predetermined input item. The predetermined algorithm, e.g. a hash function, may be pre-set or be indicated to the pen system by the security data. Likewise, the predetermined input item may be pre-set or be indicated to the pen system by the security data. In fact, in one special embodiment, the pen system is capable of deriving the encryption key without any security data, by operating a pre-set algorithm on a pre-set input item. The above-mentioned definition data, or part thereof, may form such an input item.

Then, before exposure of the file object, the pen system uses the encryption key to encrypt part of the data in the file object. The integrity of the file object may be guaranteed by calculating a hash value for the entire content of the file object before encryption, and by including this hash value in the non-encrypted part of the file object.

In the first embodiment, the receiving device must have access to the encryption key to be able to decrypt the encrypted part of the file object. Thus, the key may be stored in the receiving device. Alternatively, the receiving device may access a database which associates encryption keys with page addresses. The aforesaid generation tool may then interact with this database, so that an appropriate association is created therein for each coded product that is generated. Thus, upon receipt of the file object, the receiving device may extract a page address (from the non-encrypted part of the file object), derive the proper encryption key from the database based on this page address, and use the encryption key to decrypt the encrypted part of the file object. For increased security, the encryption key is only available for decryption of data received from a specific pen or a specific type of pen, given by the pen parameter. Further, any well-known measure for authentication and confidentiality may be provided in the communication between the receiving device and the database.

In a second embodiment, the pen system extracts a public key of the intended receiving device from the imported security data, derives a random number from a random number generator in the pen, uses the public key to encrypt the random number, and includes the thus-encrypted random number in the file object. Further, the pen system calculates, based on a first predetermined algorithm, a hash value for the random number, and uses this hash value as an encryption key for encrypting part of the data in the file object. Again, the integrity of the file object may be guaranteed by calculating, based on a second predetermined algorithm, a hash value for the entire content of the file object before encryption, and by including this hash value in the non-encrypted part of the file object.

Upon receipt of the file object, the receiving device may extract the encrypted random number from the file object, use its private key to decrypt the encrypted random number, calculate the hash value for the random number, by using the first predetermined algorithm, and use the hash value as an encryption key for decrypting the encrypted part of the file object.

In one embodiment, the relay data and/or usage limitation data and/or security data is imported, typically in a preparatory upgrade session, via the pen's communications interface or from a memory unit inserted in the pen. In another embodiment, this input data is imported by the pen system identifying and decoding a machine-readable code in one or more images recorded by the primary image sensor of the pen.

Thus, the relay data, usage limitation data and security data may be embedded on the product as one or more machine-readable codes, in analogy with the definition code 604 in FIG. 6. Such products may, similarly to the above definition-coded products, be generated by a computer-based generation tool based on user input. Thus, a user may input a destination address of the receiving device or the application program to be encoded as relay data on the product. Likewise, a user may input the above-mentioned maximum number or expiration date. Similarly, a user may input security data for use by the pen system's Encryptor module in encrypting at least part of the data to be exposed in the information system.

The relay data, usage limitation data and security data may apply to a specific pattern page or a range of such pages. Thus, this input data suitably includes an identifier of the applicable pattern page(s), for example in the form of one or more page addresses.

It should be clear that the definition data, relay data, usage limitation data and security data may each apply to different levels of the page unit hierarchy, even if encoded in one and the same machine-readable code or imported in an upgrade session over the communications interface.

In one embodiment, the Importer module stores the imported input data (definition data, relay data, usage limitation data and security data) in a hierarchical data structure in pen memory, wherein data stored on one level of the data structure is applicable to both this level and any subordinate levels. The data structure typically reflects the page unit hierarchy (FIG. 1), so that each subordinate level represents a subset of the page unit group associated with its superior level. Thus, the Importer module stores every item of input data on its appropriate level in the hierarchy, based on its associated page address(es). Such storage provides for efficiency in finding all imported input data to be used in the processing of position data from a specific page unit, since the pen system may simply accumulate the input data that is stored for the relevant page unit group on each level in the hierarchy, between a top-most level and the specific page unit. For example, security data associated with a specific segment is stored on segment level in association with the specific segment, usage limitation data associated with a specific shelf in this segment is stored on shelf level in association with the specific shelf, relay data associated with a specific book in this shelf is stored on book level in association with the specific book, and definition data associated with a specific page in this book is stored on page level in association with the specific page. In this example, when the pen system shall process positions that belong to the specific page unit, it will find the relevant definition data on the page level, the relevant relay data on the book level, the relevant usage limitation data on the shelf level, and the relevant security data on the segment level.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, events may be generated in the pen system by the user pressing a button on the pen or issuing a verbal command to be recorded by a microphone in the pen. Thus, the trigger pidget event may be replaced or supplemented by such an event. Likewise, the content and/or context information may be indicated in the pen system by such alternative events.

It is conceivable for the pen system to automatically create a file object whenever a pen stroke is recorded. Each such file object may be created to contain strokes for a respective pattern page or book. The file objects may then be exposed either on command, or automatically, to an external data handler. Automatic exposure may involve exposure of a file system in the pen memory via the communications interface.

In the above embodiments, the division of the abstract pattern is dynamic, in that the logical positions are calculated based upon the position database in the pen. In an alternative embodiment, the division of the abstract pattern may be static, by being encoded in the pattern. For example, U.S. Pat. No. 6,330,976 discloses a coding pattern in which coding cells are tiled over the product surface, each cell coding both a local position and a page identifier. By decoding the pattern, the pen is thus capable of directly detecting its logical position.

It should also be noted that the pen may include complementary equipment for relative positioning, such as accelerometer, roller ball, triangulation device, etc. Thus, the pen may supplement the absolute positions derived from the position code with the relative positions given by the complementary equipment. In this case, the position code need only code few absolute positions on the product.

Further, the pen system may be based on any distribution of functionality between different software modules. In fact, the pen system software need not be made up of separate modules.

Still further, certain aspects of the present invention are not limited for use with file objects as described herein. In particular, the above Importer functionality (section 16. Importer) may be incorporated also in pen systems designed for end-to-end communication with lookup servers and application servers, as described by way of introduction.

The invention claimed is:

1. A method in an electronic pen, comprising:
importing non-position data via an import interface of the electronic pen;
storing the imported non-position data in a memory of the electronic pen;
determining position data in a predefined coordinate system when the electronic pen writes on a product during movement of the electronic pen on the product, wherein the position data is used to code an absolute position on the product such that a stroke of the electronic pen on the product is represented based on the coded absolute position; and
processing the position data on the basis of the stored non-position data.

2. The method of claim 1, wherein the non-position data comprises at least one of: definition data, relay data, security data, and usage limitation data.

3. The method of claim 1, wherein the non-position data comprises definition data that defines at least one functional area in said coordinate system, said processing comprising mapping the position data against the definition data to identify if the position data falls within said at least one functional area.

4. The method of claim 3, wherein said processing comprises operating a dedicated processing rule on the position data that falls within said functional area.

5. The method of claim 4, wherein the dedicated processing rule is included in the non-position data.

6. The method of claim 1, wherein the non-position data comprises definition data that defines all functional areas of the product.

7. The method of claim 3, further comprising operating a man machine interface (MMI) of the electronic pen based upon identification of the position data falling within said at least one functional area.

8. The method of claim 1, wherein the non-position data is stored in association with a page address, the page address being indicative of at least one of a plurality of page units defined in said coordinate system.

9. The method of claim 8, wherein said storing further comprises identifying the page address from the imported non-position data.

10. The method of claim 8, wherein the page address indicates at least a first and a second level in a hierarchy of page units, the first level comprising groups of page units, and the second level comprising individual page units.

11. The method of claim 10, wherein the non-position data is stored in a data structure that represents said hierarchy.

12. The method of claim 8, wherein said processing further comprises:
identifying a page address from the position data; and
deriving, from the memory, any non-position data stored in association with the thus-identified page address.

13. The method of claim 1, wherein said import interface communicates with a communications interface in the electronic pen to import said non-position data.

14. The method of claim 1, wherein said import interface communicates with a memory unit installed in the electronic pen to import said non-position data.

15. The method of claim 1, wherein said importing non-position data comprises processing at least one image of a non-position code.

16. The method of claim 1, wherein said determining position data comprises processing at least one image of a position code arranged on the product.

17. An electronic pen, comprising:
a memory;
an importer which is operable to import non-position data via an import interface of the electronic pen and store the imported non-position data in the memory;
a positioner which is operable to determine position data in a predefined coordinate system when the electronic pen writes on a product during movement of the electronic pen on the product, wherein the position data is used to code an absolute position on the product such that a stroke of the electronic pen on the product is represented based on the coded absolute position; and
processing logic which is operable to process the position data on the basis of the stored non-position data.

18. The electronic pen of claim 17, wherein said importer stores the non-position data in association with a page address, the page address being indicative of at least one of a plurality of page units defined in said coordinate system.

19. The electronic pen of claim 18, wherein said importer identifies the page address from the imported non-position data.

20. The electronic pen of claim 18, wherein the page address indicates at least a first and a second level in a hierarchy of page units, the first level comprising groups of page units, and the second level comprising individual page units.

21. The electronic pen of claim 20, wherein the non-position data is stored in a data structure that represents said hierarchy.

22. The electronic pen of claim 18, wherein said processing logic identifies a page address from the position data; and
derives, from the memory, any non-position data stored in association with the thus-identified page address.

* * * * *